US010868740B2

(12) United States Patent
Eränkö

(10) Patent No.: US 10,868,740 B2
(45) Date of Patent: Dec. 15, 2020

(54) SYSTEMS FOR FEED-BACK COMMUNICATION IN REAL-TIME IN A TELECOMMUNICATION NETWORK

(71) Applicant: Timo Eränkö, Helsinki (FI)

(72) Inventor: Timo Eränkö, Helsinki (FI)

(73) Assignees: Timo Eränkö, Helsinki (FI); Sampo Simojoki, Espoo (FI)

( * ) Notice: Subject to any disclaimer, the term of this patent is extended or adjusted under 35 U.S.C. 154(b) by 45 days.

(21) Appl. No.: 14/607,538

(22) Filed: Jan. 28, 2015

(65) Prior Publication Data

US 2016/0218940 A1    Jul. 28, 2016

(51) Int. Cl.
| | |
|---|---|
| H04L 12/26 | (2006.01) |
| G08G 5/04 | (2006.01) |
| H04L 29/06 | (2006.01) |
| H04L 29/08 | (2006.01) |
| G08G 5/00 | (2006.01) |

(52) U.S. Cl.
CPC .......... H04L 43/04 (2013.01); G08G 5/0039 (2013.01); G08G 5/045 (2013.01); H04L 43/0805 (2013.01); H04L 67/12 (2013.01); H04L 67/18 (2013.01); H04L 67/42 (2013.01)

(58) Field of Classification Search
CPC ...................................................... H04L 43/04
See application file for complete search history.

(56) References Cited

U.S. PATENT DOCUMENTS

| | | | | |
|---|---|---|---|---|
| 8,938,416 | B1 * | 1/2015 | Cole | G06F 16/24556 |
| | | | | 707/607 |
| 9,104,201 | B1 * | 8/2015 | Pillai | B64C 39/024 |
| 9,954,910 | B1 * | 4/2018 | Pope | G06Q 10/101 |
| 2004/0006424 | A1 | 1/2004 | Joyce et al. | |
| 2005/0143096 | A1 * | 6/2005 | Boesch | G01S 5/0027 |
| | | | | 455/456.3 |

(Continued)

FOREIGN PATENT DOCUMENTS

| | | |
|---|---|---|
| CN | 102637359 A | 8/2012 |
| CN | 103442040 A | 12/2013 |
| WO | WO 03/021509 A2 | 3/2003 |

*Primary Examiner* — Tonia L Dollinger
*Assistant Examiner* — Joseph M Cousins
(74) *Attorney, Agent, or Firm* — Robert P. Michal, Esq.; Carter, DeLuca & Farrell LLP

(57) ABSTRACT

A system with feed-back communication in real-time in a telecommunication network includes a server holding a communication service and client devices connected to the server. The communication service keeps track of continuously received client device information. The communication service holds an algorithm, which continuously creates unique status and comparison information associated with each client device in real-time. Furthermore, the communication service sends information created by the algorithm in the form of a unique client-wise feed-back report showing the situation based on the information for a given point of time. The invention is also concerned with a method for feed-back communication used in the system, and a communication service program product in a server in a telecommunication network and connected to client devices, which communication service program product performs the steps of the method of the invention when run in a computer readable media.

36 Claims, 4 Drawing Sheets

(56) References Cited

U.S. PATENT DOCUMENTS

| | | | |
|---|---|---|---|
| 2005/0197775 A1* | 9/2005 | Smith | G08B 21/10 702/3 |
| 2009/0112460 A1* | 4/2009 | Baker | G06Q 20/102 701/532 |
| 2009/0292408 A1* | 11/2009 | Shafaat | G01C 21/00 701/4 |
| 2009/0319096 A1* | 12/2009 | Offer | G06Q 10/06 701/2 |
| 2010/0073363 A1* | 3/2010 | Densham | G05B 17/02 345/419 |
| 2014/0244153 A1* | 8/2014 | Dorum | G01C 21/3632 701/409 |
| 2014/0280388 A1* | 9/2014 | Fox | G06F 17/30091 707/812 |
| 2015/0095122 A1* | 4/2015 | Eramian | G07B 15/00 705/13 |
| 2015/0161554 A1* | 6/2015 | Sweeney | G06Q 10/06311 705/7.15 |
| 2015/0276917 A1* | 10/2015 | Dawber | G01S 5/06 342/25 A |
| 2016/0055605 A1* | 2/2016 | Kim | G06Q 10/04 701/465 |
| 2016/0119424 A1* | 4/2016 | Kane | G08B 27/001 709/203 |
| 2016/0155339 A1* | 6/2016 | Saad | G05D 1/0295 701/25 |
| 2016/0163205 A1* | 6/2016 | Jenkins | G08G 5/0069 701/3 |
| 2017/0097639 A1* | 4/2017 | Edwards | G07C 5/008 |

* cited by examiner

SYSTEMS FOR FEED-BACK COMMUNICATION IN REAL-TIME IN A TELECOMMUNICATION NETWORK

TECHNICAL FIELD

The invention is concerned with feed-back communication in real-time in a telecommunication network including a server holding a communication service and client devices connected to the server. Furthermore, the invention is concerned with a communication service program product.

BACKGROUND INFORMATION

A telecommunication network consists of computers and devices connected to one another so as to enable telecommunication between them.

Telecommunications greatly increase and expand resources to people. For example, businesses and project workers can use telecommunication network for project management. With Internet, computer, and other networks, resources can be efficiently allocated.

For example, an office filled with computers can share files together on each separate device. Computer networks can range from a local area network to a wide area network. The difference between the types of networks is the size. The Internet network can connect computers worldwide but also limited systems can use internet for communication. Among other purposes, the Internet can be used for project work and communication.

Cloud computing is computing in which computers and servers are networked to allow centralized data storage and online access to computer services or resources. Clouds can be classified as public, private or hybrid. In a model using software as a service, users are provided access to application software and databases. Cloud providers manage the infrastructure and platforms that run the applications.

Project management is the process and activity of planning, organizing, and controlling resources and actions to achieve specific goals based on the principles of human interaction and collaboration management.

Projects usually proceed in many phases and the monitoring and control also provides feedback between the project phases, in order to implement corrective or preventive actions and changes to bring the project into compliance with the project management plan.

Systems for computer based project management exist.

WO publication 03/021509 discloses one such method. A schedule of tasks to be performed on behalf of specific service tasks such as individuals by a particular worker of a number of workers is disclosed. In an embodiment, the method includes receiving worker identification information; compiling a list of tasks to be performed by a worker in response to the received identification information based on a role assigned to the worker and a list of service tasks.

Prior art work flow engines permit workflow processes of projects to be followed and define work steps to be done. They are suitable for long term projects that proceed slow enough for goals and steps to be redefined but they can not be used in projects with rapidly changing situations requiring collecting of real-time information and quick individual decision-making on actions. In such projects, the actors perform their actions simultaneously in cooperation and therefore are always planned in advance.

CN patent application 103442040A is presented as a prior art of systems collecting real-time location information. It discloses a passenger car data communication method and involves connecting a data collecting terminal with a control center server. An external application service is utilized for managing information. The invention discloses a data communication method for a passenger transport card swiping point system. Passenger information is collected through the data collecting terminals when passengers swipe cards to get on and down a bus. The passenger information and corresponding GPS information are temporarily stored after which it is sent to the terminal communication server at regular time intervals or in real time in a queue mode. The passengers themselves do not, however, share or receive any information.

There is a need for dynamic project management solutions that can be used by participants of projects wherein the actions of the participants are dependent on the actions of other participants in real-time.

Some such dynamic project management solutions exist, which are mentioned as prior art.

US patent application 2004/0006424 presents a system for dynamic tracking, wherein position sensors are located in each desired target along with a communication mechanism that sends positioning reports from each target and uses this information to drive a system of linear kinematic equations that model each target's dynamic behavior. The system facilitates estimates of projected location of the moving target.

The invention presented in the Chinese patent application CN102637359A provides a taxi sharing cluster optimization system based on a complex road network. A static road network database is used for storing structure information and digital information of a complex road network and a dynamic sharing database is used for storing taxi information, passenger sharing information and the like which are acquired in real time. A matching scheme is generated in the dynamic sharing database and the matching scheme is sent to a service terminal. By adopting the optimization system and the optimization method which are disclosed by the invention, sharing optimization can be realized, and the service efficiency of taxi resources can be effectively improved.

These solutions, however, do not provide the participants themselves sufficient real-time information for decision making and cannot be used in situations requiring immediate actions.

SUMMARY

The system of the invention is concerned with feed-back communication in real-time in a telecommunication network. The system includes a server holding a communication service and client devices connected to the server. The system is mainly characterized in that the communication service keeps track of client device information that is continuously received. The system holds an algorithm, which continuously creates unique status and comparison information associated with each client device in real-time. Furthermore, the system has means for managing information created by the algorithm in the form of a unique client-wise feed-back report showing a situation based on the information for a given point of time.

The invention is also concerned with a method for feed-back communication used in the system. In the method, the communication service continuously receives and keeps track of client device information and creates status and comparison information associated with each client device in real-time by using an algorithm. The communication service continuously manages information created by the algorithm in the form of a unique client-wise feed-back report showing a situation based on the information for a given point of time.

The invention is furthermore concerned with a communication service program product in a server in a telecommunication network and connected to client devices, which communication service program product performs the steps of the method of the invention when run in a computer readable media.

Preferable embodiments are presented in the sub claims and in the following.

The client device information might be sent to the communication service form the client devices.

The invention can be implemented in a lot of different kinds of systems or networks. In some of them, the client device is directly connected to or is a part of an object to be followed up. The client device can even itself be the object to be followed up in the invention. In these cases, the unique client-wise feed-back report might be received by the client device from the communication service.

In other systems, the client device might e.g be a sensor or other measurement equipment that collects information of an object to be followed on distance, whereby client device information and client device status information might be collected by laser or other measurements, optical observations, via the Internet, or echo sounding from the object in question.

The status information can consist of the real-time existence of a client device in the system, continuous real-time information of each individual client device, identification information of a client device, environmental information and the real-time geographical position of a client device or the object it is associated with.

The real-time information of each individual client device can e.g. consist of temperature and constructional information of client devices (or of objects which they are connected to or are associated with) and changes in those, and information of chemical and physical changes in them, like the number of passengers, the engine state, fuel state, and/or battery state if the object is a vehicle.

The environmental information might consist of weather conditions and/or traffic information.

The geographical position may be sent automatically to the communication service by e.g. the United States Global Positioning System, GPS, the Russian Global Navigation Satellite System, GLONASS, or Galileo, which is a global navigation satellite system (GNSS) currently being built by the European Union (EU) and European Space Agency (ESA).

When the communication service serves a project of client devices (or objects they are connected to) in action, the status information can consist of the participation of a client device in the project of client devices or objects in action, the real-time and/or intended actions of the individual client device in question in the project. The intended actions might consist of movement information, information of the intended movement direction(s), information of actions to be performed and/or information of retire or back-off.

The unique comparison information created by the algorithm consists of continuous real-time information of each individual client device as compared to any other client device or devices and the information (possibly to be received by an individual client device) consists of real-time information of one or more other client devices. The information can consist of subjective real-time comparison information of one or more other client devices as compared to an individual client device that (possibly) receives the information from the service.

The comparison information is a feedback report and the comparison information concerned with an individual client device can have an influence of the action to be performed by a client device. The information continuously received and associated with an individual client device in time can therefore be a base for actions to be performed in real-time and for deciding intended actions in a project.

The system is a feed-back system for or concerning the client devices communicating with the service.

The project can be a military project for performing a military exercise, whereby the client devices are devices used by users participating in the project or the client devices are military robots moving within the fight area.

The project can also be a military project for military attacks for coordinating attacking flying aircrafts, drones or missiles, whereby the client devices communicate with the service and send and receive information of the flying aircrafts and having means for indirectly or directly steering the flying objects or for coordinating attacking submarines, whereby the client devices communicates with the communication service and send and receive information of the submarines and have means for indirectly or directly steering them.

Furthermore, the project can be a sport event for managing movement of people and/or vehicles (driverless or autonomous vehicles for instance), a system for avoiding traffic jams by managing movement of vehicles, a project for distributing goods or transporting people or animals by managing movement of the vehicles distributing the goods or transporting the people or the animals, a system for managing movement of driverless motor vehicles, such as cars, aircraft, such as helicopters, or spacecraft a system for playing a game or for managing movement of miniature vehicles.

The project can also be a system for medical use in e.g. following up cancer cell growth and spread, whereby the client devices can be fastened to cells in the form of nano robots or the client devices can consist of sensors or measurement equipment outside or inside the body performing measurements of the cells. Thus, the invention can be applied on micro and nano level. Along with developing nanotechnology, it is e.g. possible to transport individual molecules by means of client nano robots (used as client devices) for enabling precision medication. At service level, it is e.g. possible to keep track on which part of an organ a medicine has been dosed and to follow the response of the cells to the medicine, and thereby influence on the actions performed by the nano robots.

A future use of the invention is to manage the position of isolated molecules, individual atoms and/or even stable particles (electrons, positrons, and other subatomic particles) by foreseeing them with client devices that act as magnetic bottles or magnetic traps or magneto-optical traps. Such uses are expected to be useful in connection with quantum computers, whereby the quantum state of an individual particle can work as a microprocessor.

A magnetic bottle is the superposition of two magnetic mirrors. For example, two parallel coils separated by a small distance, carrying the same current in the same direction will produce a magnetic bottle between them. Magnetic bottles can be used to temporarily trap charged particles. A magnetic mirror is a magnetic field configuration where the field strength changes when moving along a field line.

Furthermore, the project can be system, wherein the client devices are in satellites for TV use, for weather forecasts, for positioning and for military use.

Other projects that can involve the use of sc. "virtual clients", i.e. to which no communicative client device is directly connected, but the movements of which can be followed, can be projects, wherein the positioning information of objects is important in the steering of the objects. The state and status of these objects, here called virtual clients, can be measured by means of laser, optical observations, by means of public (Internet) information and/or echo sounding. The client device information to be followed can be e.g. the location and position in space, movement direction, speed, acceleration, rotational motion, and temperature of the object.

Use examples for the last mentioned category can e.g. be follow up of asteroids and other moving objects and pieces in the space that involve risks for satellites, enemy vehicles, vessels and smaller flying models, movements of emergency vehicles, public transport, accident places, or phenomena that have an (temporary) impact on traffic, like roadwork.

The algorithm continuously creates unique status and comparison information associated with each client device in real-time in the communication network including a server with the communication service and the client devices.

The server consists of server-software (in the form of a communication service) for receiving data for the client devices, for running the real-time algorithm, which continuously creates unique status and comparison information for each client device in real-time, and possibly for sending the information created to the client devices.

In the step, wherein the communication service receives and/or the client devices transmit real-time status information, such as location and direction information, or other information-report relevant to the "client state", the 'client state' is a generic set of 'tuples' containing status information, wherein e.g.
a tuple consists of a key and value—pair,
where a key, also known as a name or attribute (such as "airspeed" or "direction heading" by referring to the examples presented later on) holds a label or title of the tuple-value.
and where a value, contains the respective value—information (such as "120 km/h" or "90 degrees") of the tuple.

The following step consists of the server-software receiving 'client state reports' of client devices transmitted by the client devices over the communication network.

The algorithm executed within said server-software consists of a statistical analysis function of the latest snapshot of 'client state'-reports, and of a combination function that generates 'comparison information'-report unique to each user device.

The analysis function collects the latest 'client state'-reports, and applies a 'map-reduce-function' on each respective 'tuple' contained within the reports.

where the map-sub-function accumulates tuples from the 'client state'-reports (map-reduce-step 1), and applies the reduce function on each tuple (map-reduce-step 2) of said 'client state',
where the reduce-sub-function performs a recursive or sequential accumulation of respective key-values (map-reduce-step 3), and consequently filters out irrelevant tuple-values (map-reduce-step 4) based on 'distance function' of 'set-configuration' of 'client devices' tuple values, resulting in response report data, the 'situation data' specific to each client for the particular moment in time.

where the 'distance function' is a metric distance function or metric tensor, simplified as distance d for said accumulated sets of tuples (X), e.g. d: X×X. Such as the distance between letters of the alphabet, or location coordinates.

where the 'set-configuration' consists of 'set' that defines the value-set and the 'translation functions' needed for computation, and 'priority function' that enable preference or priority for resultant distances (for example, "location"-distance metric more important than "color"-metric, constraints for maximum and/or minimum distance). 'Set' is dependent on environmental factors and application (such set-configuration could include "location", "destination", "altitude-from-sea-level" or "color"). 'Translation functions' are required for arbitrary computation (for example, converting from one coordinate-system to another, or color-names to Red-Green-Blue colorspace, i.e. RGB-colorspace).

Map-reduce is a programming model and an associated implementation for processing and generating large data sets with a parallel, distributed algorithm. Map-reduce can also be implemented in sequential computing environment.

Next, the 'server-software' transmits the resultant, unique 'situation report' to 'client device' via the communication network.

With client device is meant e.g. a user device or a robot with a piece of computer hardware or software that accesses the communication service made available by the server(s).

The server holding the communication service can consist of only one server or several servers, which can be members of a computer system, in which the client devices access the service by way of a telecommunication network. The term applies to programs or devices that are part of a client-server model. Also the functions of the service can be distributed over several servers (a server cluster) and the servers can be situated in the client devices, too.

The telecommunications network, which preferably is the Internet, allows the client devices to exchange data with the server. The client devices and the one or more servers pass data to each other along data connections with the Internet protocol suite, commonly known as the (TCP/IP) protocol using Transmission Control Protocol (TCP) and the Internet Protocol (IP), and wherein data is transferred in the form of packets. The connections are established using either cable media or wireless media but preferably in this invention by using wireless media in which case the client devices are mobile devices.

The invention provides a novel and innovative solution for managing the actions of cooperating or moving objects and devices by means of a central server or distributed servers that holds a communication service.

The client devices are connected to the service, which service receives their identification information and in addition information of location, moving direction or intention, actions and/or intended actions of the client devices or the objects they are associated with in real-time. As the service creates unique status and comparison information of each client device, which can be communicated individually to each client device, there are different real-time situation reports associated with each client device. As the client devices continuously send information to the server to be handled by the communication service, the client device information is continuously updated. The report thus describes the situation subjectively of a point of view of an individual client device at a given point of time, whereby each report is based on updated client device information.

Therefore each client device at the same time is concerned with a different report compared to the other client devices, since it describes the situation of the individual client device that the report was sent to or with which it was concerned in relation to the other client devices. In addition, the report might contain objective information of the client devices as well.

Each client device or the service can modify and decide on actions based on that information as a feed-back action or alternatively, the communication service might give instructions based on the created status and comparison information.

As each client device or an object it is associated with has a functional and/or geographical goal, it is important to get relational status and comparison information in real-time. Also the identification information of the other devices, such as their IP address, can be communicated to each device. Especially, each device can make use of subjective information on its position and role in relation to one or more other devices.

It is important to note that the client devices are not concerned with or presented exactly the same information and not simultaneously. The invention deals with a new type of feed-back technology providing subjective comparison results in a telecommunication network. Technically, this system offers the client devices a real-time subjective, personalized and specific response, which information is handled either by a human or a robot or software anywhere in the system. It can efficiently be utilized in several applications to manage the movement of e.g. driverless cars, helicopters or space rockets. The system of the invention enables safe travelling for a large amount of objects by preventing e.g. collisions. Conversely, this invention enables efficient large-scale temporal-spatial delivery of goods to moving targets.

The unique, personalized and terminal-specific or client device-specific real-time comparison information offers the possibility to interlink interaction between humans and computers which, in turn, will help to utilize many practical everyday life solutions in the future. Technically, this invention can be connected to the concept of making new solutions and applications in the "internet of things" scenario.

The Internet of Things (IoT) is the interconnection of uniquely identifiable embedded computing devices within the existing Internet infrastructure. An embedded system is a computer system with a dedicated function within a system with real-time computing constraints. Embedded systems control many devices in common use today. Integration with the Internet implies that devices will utilize an IP address as a unique identifier. An Internet Protocol address (IP address) is a numerical label assigned to each device or computer participating in a network that uses IP for communication.

Today computers are dependent of human beings for information. The problem is that people have limited time, attention and accuracy and they are not very good at capturing information about things in the real world. The prior art project management solutions rely on information from human beings. This invention is a step towards a system, wherein the computers have the information they have tracked and calculated by generating great advantages.

The invention can be applied for performing military actions, for navigation applications, for avoiding traffic jams and stocks, for redirecting rockets, for transports of goods and people, for managing sports events and competitions, for playing with miniature vehicles and for playing games. The invention will be of increasing practical use when cloud services keep developing and improving.

Further, the invention can be used in automated price fixing in for instance department stores depending on the sales amount, customer information and whereabouts of the sold articles (which articles can be electronic products such as music, foreign exchange valuation, stock market etc., too). This gives customer research management (CRM) and marketing new possibilities in fast changing situations. In these applications, the client devices are fastened on the articles to be sold being the objects.

In some embodiments, the invention possibly uses combinatorial optimization or distributed combinatorial optimization methods as a start basis for setting up the projects.

Combinatorial optimization is a subset of mathematical optimization that is related to algorithm theory and computational complexity and can be used in several fields in software engineering. Applications for combinatorial optimization include, but are not limited to, developing the best airline network of spokes and destinations, deciding which taxis in a fleet to route to pick up fares, determining the optimal way to deliver packages. Specific problems, wherein combinatorial optimization might be used is for solving e.g. vehicle routing, scheduling and rescheduling problems.

Distributed combinatorial optimization problems extend the scope of conventional combinatorial optimization problems to scenarios where multiple decision-makers are involved. Each decision-maker can make choices from an action set, and the global objective function is determined by the choices of all decision-makers. Each decision maker can observe the choices of other decision-makers, but not their action sets, i.e., only the selected action can be observed and not the complete view.

In the following, the invention will be described by means of some illustrative embodiments and examples, to the details of which the invention is not restricted.

DETAILED DESCRIPTION

Figure 1:
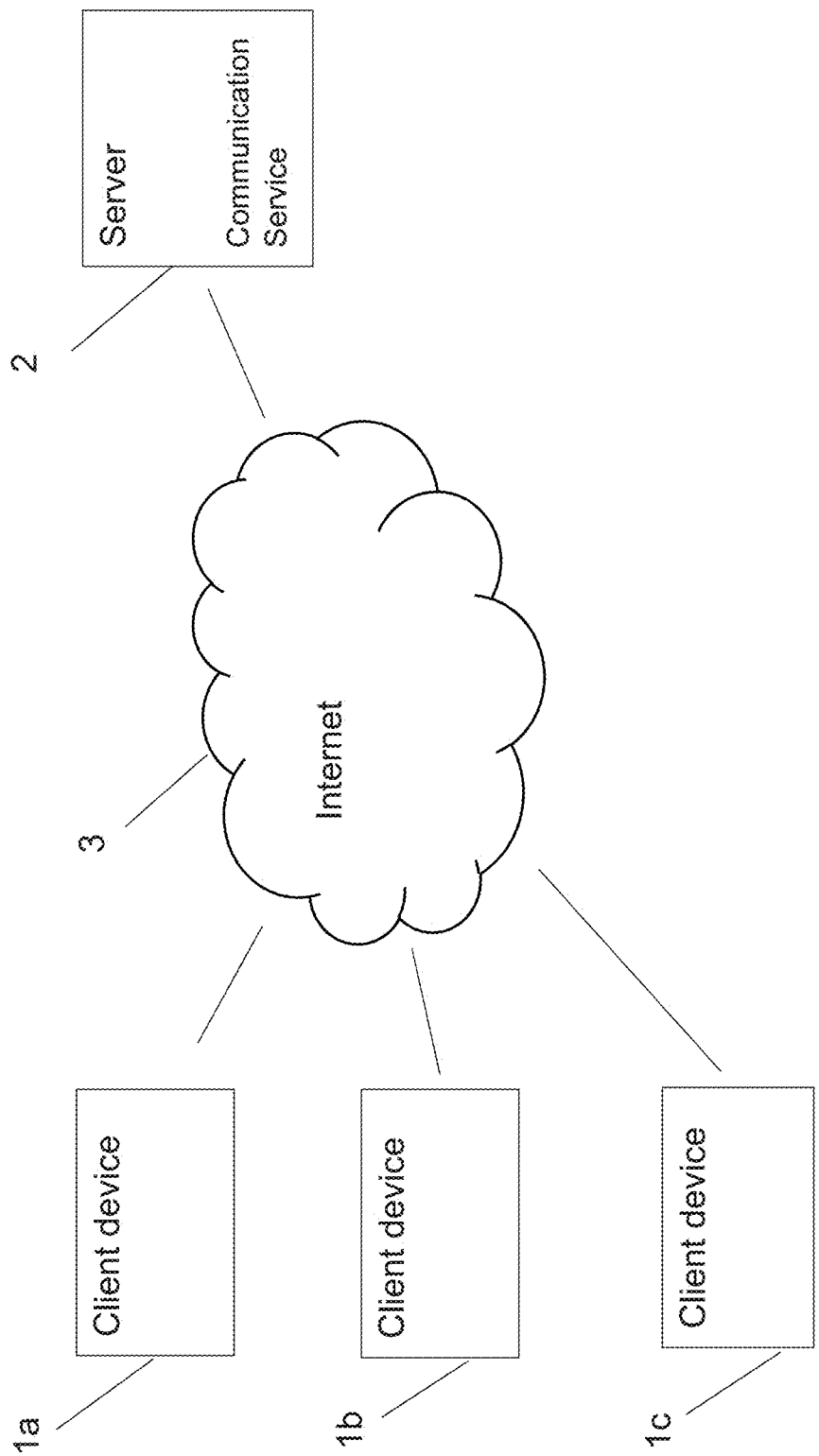
FIG. 1 is an architecture view of a telecommunication network, wherein the invention can be implemented.

FIG. 1 is an architectural view of a telecommunication network, wherein the invention can be implemented.

Client devices 1a, 1b, 1c are connected to a communication service provided as a cloud service via the Internet 3 by a service provider holding a server 2. In reality, there are usually much more client devices connected, but in FIG. 1, only three are presented for clarity reasons. Also the functions of the server 2 can be distributed over several servers or there can be several servers 2 holding the communication service and said one or more servers 2 can e.g. be situated in the client devices.

Embodiment Example 1

Figure 2:
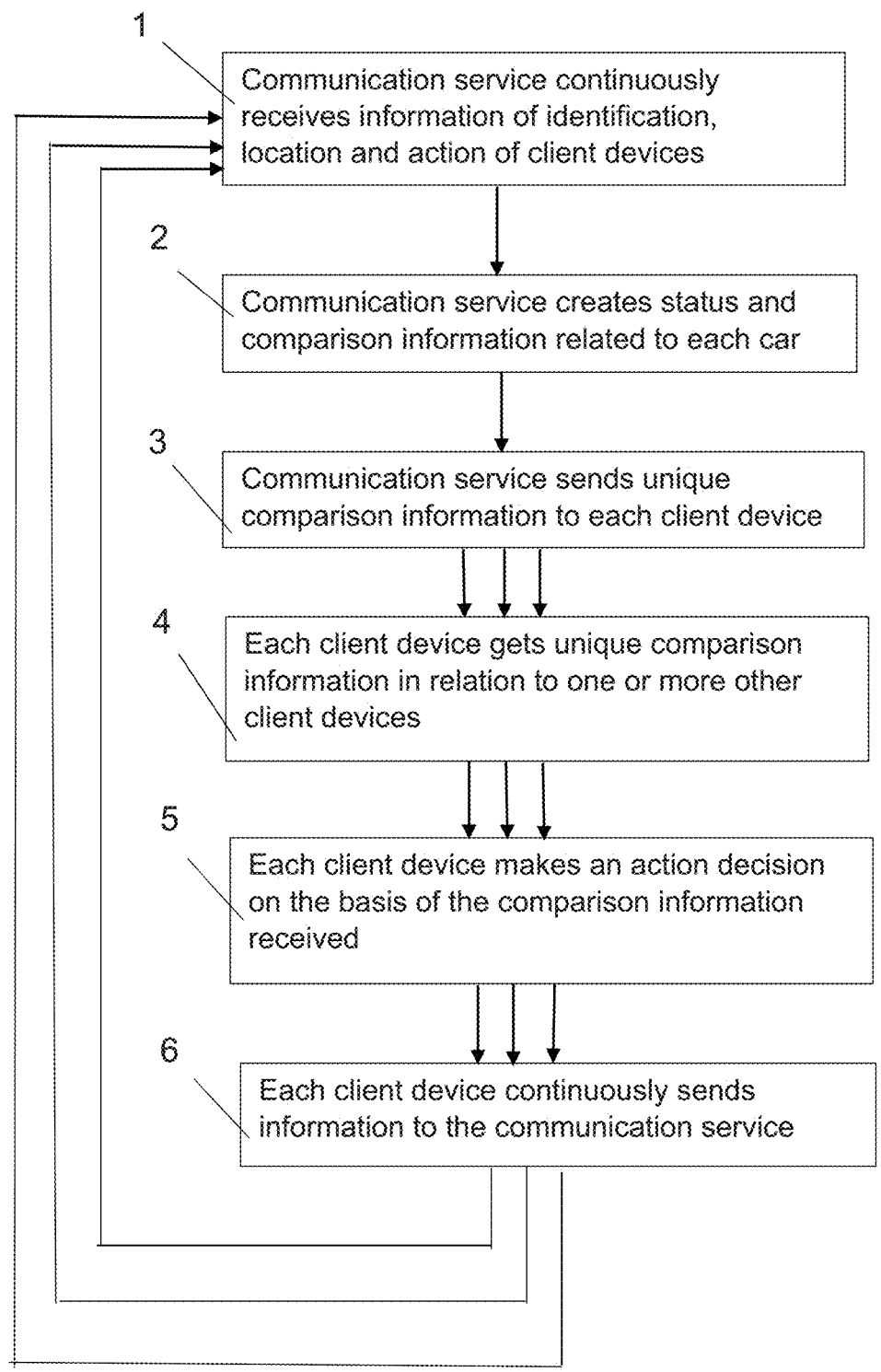
FIG. 2 is a flow scheme of a first embodiment example of the invention, wherein the invention is applied for managing public service in a big city.

FIG. 2 is a flow scheme illustrating how the communication of the system of the invention can take place in a first embodiment example of the invention.

It is assumed that the client devices are situated in service cars on different places in a road network. The service cars can be ambulances or other first aid cars, transport cars, police cars or other service cars to help people.

The intention is that the cars, in which the client devices are situated should move as efficiently as possible in the city they are serving in order to cover the area of the city so they should circulate at a distance from each other or they should move to a place they are needed. The pattern of movement of the cars is dependent on delays of other service cars when they are needed in and give service to people at a given time and if they can not proceed as planned. Those cars that are not delayed of any reason should change their intended route or circulation pattern to compensate for the cars that are not circulating for the time being. Service cars that are giving service to people might even need back-up and help from other cars. The communication service provides the client devices with information on the road. The information received by a client device in a given time point in the first hand informs the situation of an information-receiving client device in relation to the closest car(s) from which information the driver or a robot of the car in which the client device is situated can instantly make moving decisions on the road. The information might also include information or direct advice how to move if e.g. an other car needs help or leaves the job for some reason.

The client devices are connected to the communication service of the invention. As indicated by step 1. The communication service continuously receives information of the identification and location of the client devices either as actively sent by the client device in a given car or automatically by the Global Positioning System (GPS).

In step 2, the communication service creates by means of an algorithm status information on each car (and possible overall information of the whole road system) and comparison information for each client device about the situation of the information-receiving client device in relation to the closest car(s) (and possibly other cars) at this time point.

In step 3, the communication service sends the unique comparison information packages to each client device. It is unique since it describes the situation at a given exact time point but also because of the subjective information of a given client device in relation to one or more other client devices. Three arrows is used to show that different messages are sent to each car.

In step 4, each client device gets the unique comparison information and possibly information of its role in relation to one or more other client devices. More in detail, in addition to the location and identification information, the information tells the situation of the information-receiving client device in relation to the closest car(s) at this time point and possibly other situation information of the other client devices and cars and direct advice how to move. Three arrows is used to show that the received by each client device are mutually different, since they are subjective with respect to a given car or client device.

In step 5, each user of a client device or the client device itself in a car makes an action decision and/or acts on the basis of the comparison information received of how to move further. Three arrows is used to show that different action decisions and actions are made with respect to each car.

Step 6 indicates that, each client device continuously sends identification, position and possible action information to be received by the communication service as indicated in step 1. Three arrows is used to show that different messages are sent from each client device.

Embodiment Example 2

Figure 3:
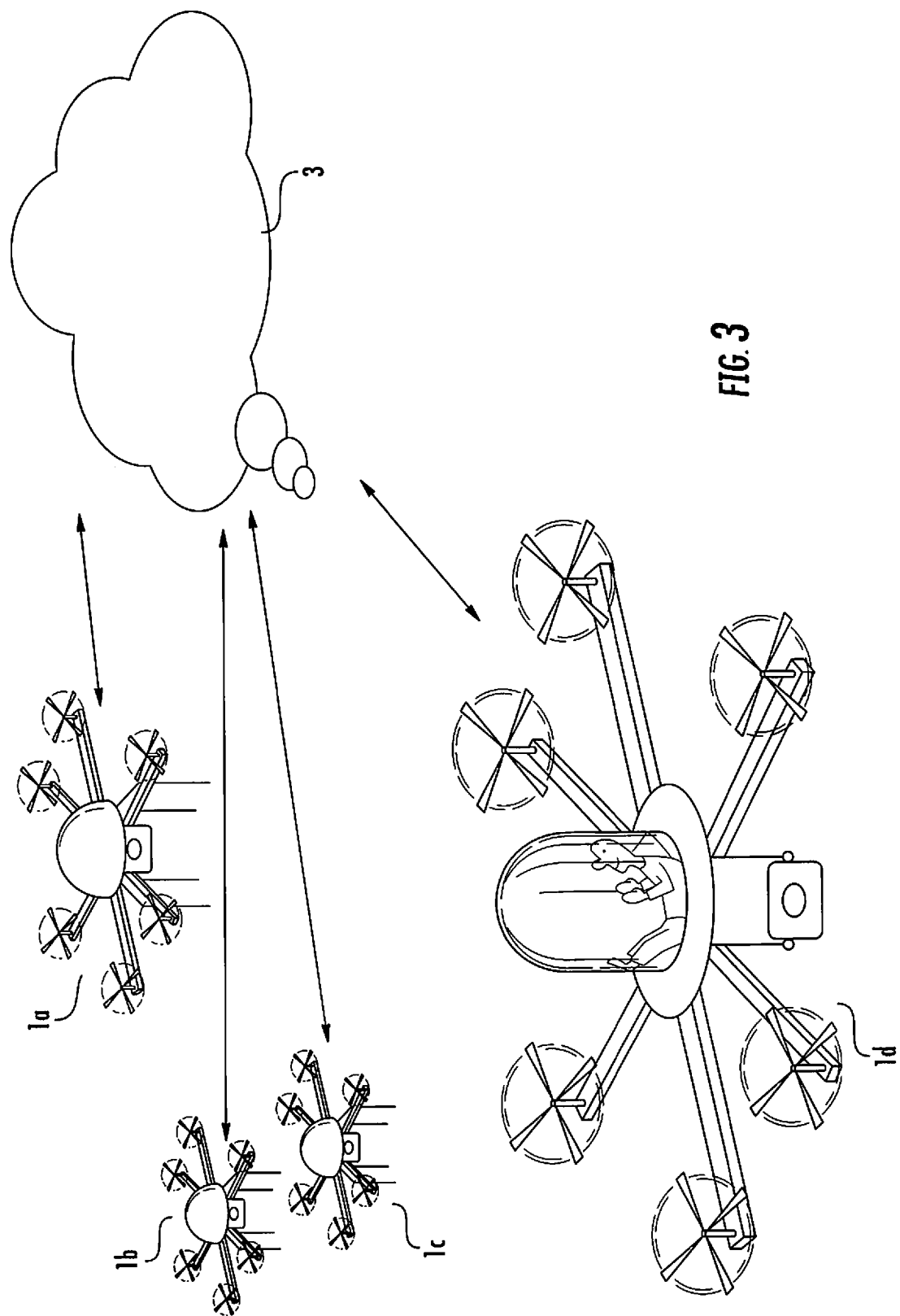
FIG. 3 illustrates an example of an architectural view of a telecommunication network, wherein the invention is implemented in a system for managing driverless helicopters.

FIG. 3 illustrates an example of an architectural view of a telecommunication network, wherein the invention is implemented in a system for managing driverless helicopters.

Client devices, which are situated in helicopters 1a, 1b, 1c and 1d, are connected to a communication service provided as a cloud service via the Internet 3 by a service provider that holds servers, which this time are situated in the helicopters as well. In reality, there are usually much more helicopters but in FIG. 3, only four of them is presented of clarity reasons.

It is assumed that the helicopters are driverless robots and the intention is to transport people efficiently from a point A to a point B and manage the movement of the helicopters and avoid collisions. The client devices are situated in the driverless helicopters on different places in different routes from point A to a point B. The communication service held by several servers, which preferably can be in the helicopters, or they can be anywhere as far as they are connected to the cloud and the client devices.

The communication service provides the client devices with information on the route. The information received by a client device in a given time point in the first hand informs the situation of the information-receiving client device in relation to the closest or all helicopter(s) from which information the robot in which the client device is situated can instantly make moving decisions on the route. The information might also include information or direct advice how to move.

The client devices are connected to the communication service of the invention through the Internet as illustrated in FIG. 3. The communication service continuously receive information of the identification and location of the client devices either as actively sent by the client device in a given helicopter or automatically by the Global Positioning System (GPS).

The communication service creates by means of an algorithm status information on each helicopter (and possible overall information of the whole helicopter traffic) and comparison information for each client device about the situation of the information-receiving client device in relation to the closest helicopter (s) (and possibly other helicopters) at this time point.

The communication service sends the unique comparison information to each client device. It is unique since it describes the situation at a given exact time point but also because of the subjective information of a given client device in relation to one or more other client devices.

Each client device gets the unique comparison information and possibly information of its role in relation to one or more other client devices. More in detail, in addition to the location and identification information, the information tells the situation of the information-receiving client device in relation to the closest helicopter(s) at this time point and possibly other situation information of the other client devices and helicopters and direct advice how to move.

Each helicopter robot makes an action on the basis of the comparison information received of how to move further.

Each client device continuously sends identification and position information to be received by the communication service until it has reached point B.

Embodiment Example 3

Figure 4:
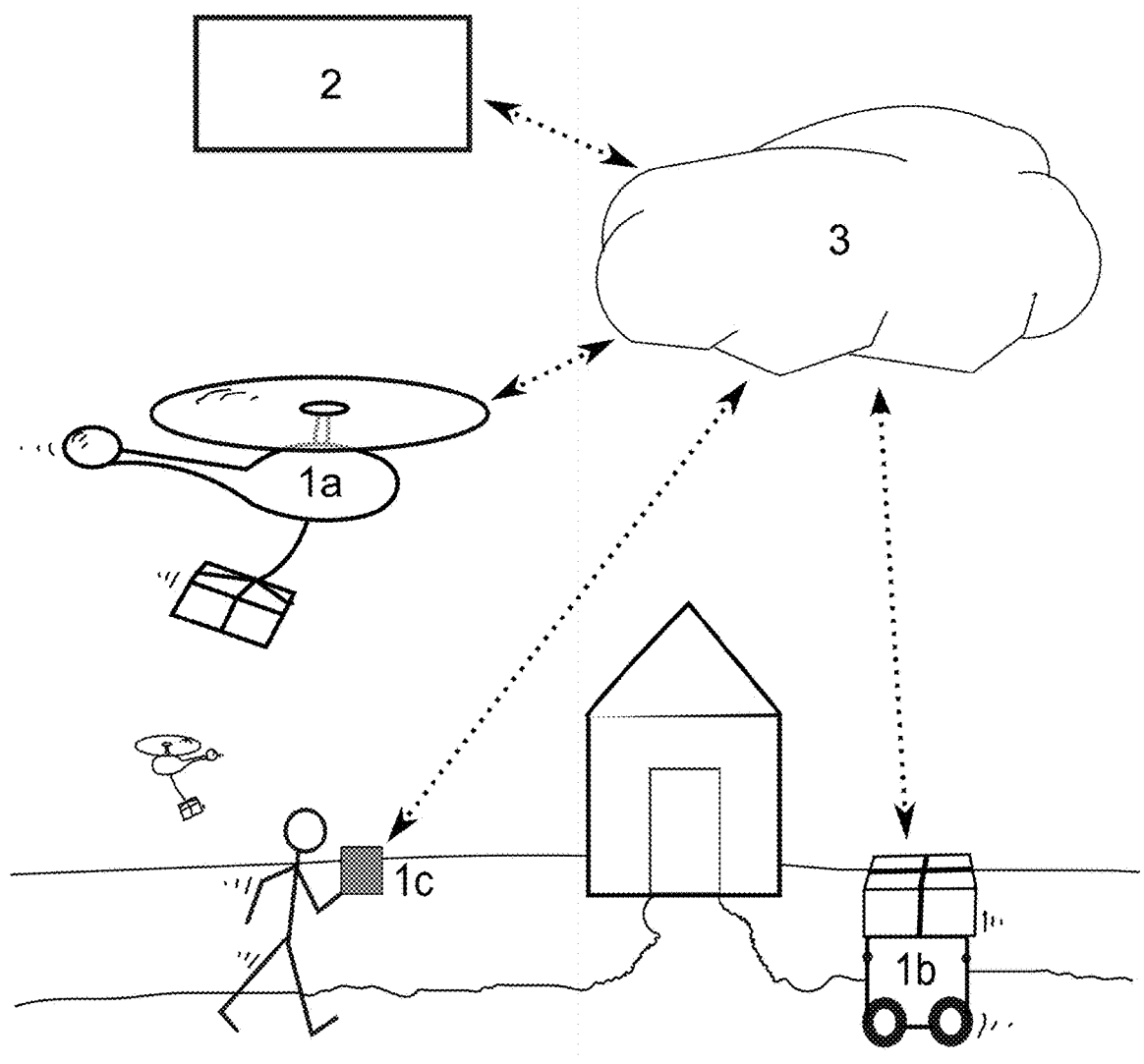
FIG. 4 illustrates an example of an architectural view of a telecommunication network, wherein the invention is implemented in a system for managing delivery of packaged goods.

FIG. 4 illustrates an example of an architectural view of a telecommunication network, wherein the invention is implemented in a system for managing delivery of packaged goods.

Client device 1a situated in a helicopter, client device 1b situated in a driverless transport vehicle, and client device 1c being a mobile device held by a user are connected to a communication service provided as a cloud service via the Internet 3 by a service provider 2. In reality, there are usually much more client devices but in FIG. 4, only three of them is presented of clarity reasons.

It is assumed that the intention is to efficiently deliver packaged goods to people on the basis of their location and to manage the movement of the helicopters and driverless transport vehicles and avoid collisions.

The communication service provides
the helicopter client devices with information of the location of the driverless vehicles or user devices
the user devices with information of the location of the helicopters or the driverless vehicles
the driverless vehicles with information of the location of the helicopters or user devices The communication service creates by means of an algorithm status information on each client device and comparison information for each client device. The information received by a client device in a given time point in the first hand informs the situation in relation to the closest other relevant client device. The information might also include information or direct advice where to deliver the packaged goods (for a driverless vehicle or helicopter) or where to pick up the packaged goods.

The client devices are connected to the communication service of the invention through the Internet as illustrated in FIG. 3. The communication service continuously receive information of the identification and location of the client devices either as actively sent by the client device automatically by the Global Positioning Service (GPS).

The communication service sends the unique comparison information to each client device. It is unique since it describes the situation at a given exact time point but also because of the subjective information of a given client device in relation to one or more other client devices.

A user with a client device 1c can receive real-time tracking status-information of their deliveries, and receive a delivery to their real-time location, as reported by their client device.

The invention claimed is:

1. A method for feed-back communication in real-time in a telecommunication network including a server configured to execute a communication service and client devices connected to the server, the method comprising:
continuously receiving device information from the client devices at the server, and wherein continuously receiving device information from the client devices includes the client devices collecting information from objects to be followed on distance, by at least one of laser measurements, or optical observations;
continuously creating status and comparison information associated with the client devices for each client device in real-time by an algorithm,
continuously determining a delay in performance of a service by a service vehicle carrying the at least one other client device;
continuously managing information created by the algorithm, at the server, in the form of a unique client-wise feed-back report showing a situation based on the information for a given point of time for each client device and including a client state;
sending mutually different unique client-wise feed-back reports to client devices;
receiving a respective one of the mutually different unique client-wise feed-back reports at a respective client device,
the communication service performing a comparison between the service performed by the service vehicle carrying the at least one other client device and a plurality of potential services to be performed by a service vehicle carrying the respective client device such that the communication service determines a service to be performed by the service vehicle carrying the respective client device and a geographic movement of the respective client device to be performed based on the mutually different unique client-wise feed-back report;
transmitting data, to the respective client device, of the service to be performed by the service vehicle carrying the respective client device and the geographic movement of the respective client device; and
the respective client device moving in response to the service to be performed based on the mutually different unique client-wise feed-back report,
wherein the algorithm includes:
accumulating a plurality of tuples from each of the client-wise feed-back reports; and
applying a map reduce function on each tuple of the client state, wherein the map reduce function:
performs at least one of a recursive or sequential accumulation of respective key-values; and
filters out irrelevant tuple-values based on a distance function of set-configuration of a client device's tuple values, where the distance function is at least one of a metric distance function or a metric tensor, and
where the set-configuration includes a set that defines a value-set, a translation function, and a priority function.

2. The method of claim 1, wherein continuously receiving device information from the client devices includes the client devices being directly connected to or being a part of or including an object to be followed up.

3. The method of claim 1, wherein continuously receiving device information from the client devices further includes the client devices being measurement means collecting information from objects to be followed on distance via the Internet.

4. The method of claim 1, wherein the client devices send status information of the real-time location of a client device in the system to the service.

5. The method of claim 1, wherein the client devices send status information of real-time geographical position, temperature, location and position, movement direction, speed, acceleration, rotational motion, chemical changes, or environmental changes to the communication service.

6. The method of claim 1, wherein the client devices send status information of real-time or intended actions for a project managed by the communication service.

7. The method of claim 1, wherein the client devices send identification information as the status information.

8. The method of claim 1, wherein the algorithm creates comparison information from the status information received, the comparison information being created continuously as real-time information associated with each individual client device as compared to any other client device or devices.

9. The method of claim 1, wherein the communication service sends real-time information of one or more other client devices to an individual client device.

10. The method of claim 1, wherein the communication service sends subjective real-time comparison information of one or more other client devices as compared to the individual client device that the information is sent to.

11. The method of claim 1, wherein each individual client device or the service use the information continuously received as a base for actions to be performed and for deciding intended actions in a project managed by the communication service.

12. The method of claim 1, further comprising a person or vehicle carrying the respective client device performing the service.

13. A non-transitory computer readable storage medium embodying computer executable instructions which when executed by a processor in a telecommunication network and connected to client devices, causes the telecommunication network to:
  a) continuously receive real-time client device information from a plurality of client devices, and wherein continuously receiving device information from the client devices includes the client devices collecting information from objects to be followed on distance by at least one of means of laser measurements or optical observations,
  b) continuously create unique status and comparison information associated with each of the client devices in real-time by using an algorithm,
  c) continuously deliver information created by the algorithm in the form of a mutually different unique client-wise feed-back report to a respective client device of the plurality of client devices showing a situation based on the information for a given point of time, and including a client state,
  d) continuously determine a delay in performance of a service by a service vehicle carrying at least one other client device of the plurality of client devices, and
  e) determine, at the respective client device, a service to perform, based on the mutually different unique client-wise feed-back reports by performing a comparison between the service performed by the service vehicle carrying the at least one other client device with a plurality of potential services to be performed by a service vehicle carrying the respective client device, the respective client device moving in response to determining the service to perform,
  wherein the algorithm includes:
    accumulating a plurality of tuples from each of the client-wise feed-back reports; and
    applying a map reduce function on each tuple of the client state, wherein the map reduce function:
      performs at least one of a recursive or sequential accumulation of respective key-values; and
      filters out irrelevant tuple-values based on a distance function of set-configuration of a client device's tuple values, where the distance function is at least one of a metric distance function or a metric tensor, and
      where the set-configuration includes a set that defines a value-set, a translation function, and a priority function.

14. A system for feed-back communication in real-time in a telecommunication network, comprising:
  a server and client devices connected to the server, the server configured to execute a communication service, wherein the communication service:
    continuously receives client device information of an identification and location of the client devices, and wherein the continuously receiving client device information includes the client devices collecting information from objects to be followed on distance, by at least one of means of laser measurements or optical observations,
    continuously creates unique status and comparison information for each client device of the location of a respective client device of the client devices in relation to at least one other client device of the client devices in real-time by using an algorithm,
    continuously determines a delay in performance of a service by a service vehicle carrying the at least one other client device, and
    sends a mutually different unique client-wise feed-back report of the unique status and comparison information to each client device, the mutually different unique client-wise feed-back report for each client device including a client state and the location of the respective client device at a given exact time in relation to at least one other client device and subjectively describing the location with respect to the respective client device relative to the at least one other client device, each client device acting or deciding on actions based on the received mutually different unique client-wise feed-back report, the decisions and actions made by each client device being mutually different;
  wherein at least one client device generates a command to move in response to deciding on actions based on the received mutually different unique client-wise feed-back report, and wherein the at least one client device moves in response to generating the command, and
  wherein the algorithm includes:
    accumulating a plurality of tuples from each of the client-wise feed-back reports; and
    applying a map reduce function on each tuple of the client state, wherein the map reduce function:
      performs at least one of a recursive or sequential accumulation of respective key-values; and
      filters out irrelevant tuple-values based on a distance function of set-configuration of a client device's tuple values, where the distance function is at least one of a metric distance function or a metric tensor, and
      where the set-configuration includes a set that defines a value-set, a translation function, and a priority function.

15. The system of claim 14, wherein the client device information is received from the client devices being directly connected to or being a part of or including an object to be followed up.

16. The system of claim 15, wherein the mutually different unique client-wise feed-back report received by each client device includes real-time comparison information of one or more other client devices as compared to the respective client device.

17. The system of claim 14, wherein the client device information is further received from client devices being measurement means collecting information via the Internet.

18. The system of claim 14, wherein at least one of the client device information or the unique status and comparison information includes a real-time location of a client device in the system.

19. The system of claim 14, wherein at least one of the client device information or the unique status and comparison information includes continuous real-time information of each individual client device.

20. The system of claim 14, wherein at least one of the client device information or the unique status and comparison information includes a real-time geographical position of the communication service.

21. The system of claim 14, wherein at least one of the client device information or the unique status and comparison information includes a location and position, movement direction, speed, acceleration, rotational motion, or temperature.

22. The system of claim 14, wherein the unique status information includes at least one of weather information or information relating to efficient large scale temporal-spatial delivery of goods to moving targets.

23. The system of claim 22, wherein at least one of the client device information or the unique status and comparison information includes a real-time geographical position of the client device sending the information automatically to the communication service by the Global Positioning System, GPS, the Russian Global Navigation Satellite System, GLONASS, Galileo, or a global navigation satellite system (GNSS).

24. The system of claim 14, wherein the communication service serves a project of client devices in action.

25. The system of claim 24, wherein the project is a military project for performing a military exercise, whereby the client devices are devices used by users participating in the project.

26. The system of claim 24, wherein the project is a military project for performing a military exercise, whereby the client devices are military robots moving within a flight area.

27. The system of claim 24, wherein the project is a military project for military attacks for coordinating attacking flying aircrafts, drones or missiles, whereby the client devices communicate with the communication service and the client devices receive route information from the communication service.

28. The system of claim 24, wherein the project is a military project for military attacks for coordinating attacking submarines, whereby the client devices communicate with the communication service and the client devices receive route information from the communication service.

29. The system of claim 24, wherein the client device includes at least one of vehicles distributing the goods or transporting people or animals, autonomous robotic systems, space rockets, or miniature vehicles.

30. The system of claim 24, wherein the project is a project for following up asteroids and other moving and flying objects and pieces in the space, enemy vehicles, vessels and smaller flying models, movements of emergency vehicles, public transport, accident places, or phenomena that have an impact on traffic.

31. The system of claim 14, wherein the unique status and comparison information includes a participation of a client device in a project of client devices or objects associated with the client devices in action.

32. The system of claim 14, wherein the unique status and comparison information associated with an individual client device includes at least one of real-time or intended actions associated with the individual client device in a project.

33. The system of claim 32, wherein the intended actions include movement information, information of an intended movement direction, or information of actions to be performed.

34. The system of claim 14, wherein the unique status and comparison information created by the algorithm includes continuous real-time information of each individual client device as compared to any other client device or devices.

35. The system of claim 14, wherein information continuously received or created is a base for actions to be performed in real-time and for deciding intended actions in a project.

36. The system of claim 14, wherein the system is a feed-back system running on the client devices.

* * * * *